US008758650B2

(12) United States Patent
Marinescu et al.

(10) Patent No.: US 8,758,650 B2
(45) Date of Patent: Jun. 24, 2014

(54) GRAPHENE-BASED THERMOPILE

(75) Inventors: Radu M. Marinescu, Pointe-Claire (CA); Arthur J. Barlow, Four Marks (GB); Grigore D Huminic, Baie D'Urfe (CA); Jin Han Ju, Kirkland (CA); Hermann Karagoezoglu, Wiesbaden (DE); Michael Ersoni, Saint-Laurent (CA)

(73) Assignee: Excelitas Technologies Singapore Pte. Ltd., Singapore (SG)

( * ) Notice: Subject to any disclaimer, the term of this patent is extended or adjusted under 35 U.S.C. 154(b) by 105 days.

(21) Appl. No.: 13/542,300

(22) Filed: Jul. 5, 2012

(65) Prior Publication Data

US 2013/0069194 A1    Mar. 21, 2013

Related U.S. Application Data

(60) Provisional application No. 61/504,659, filed on Jul. 5, 2011.

(51) Int. Cl.
*G01J 5/12* (2006.01)
*G01J 5/08* (2006.01)

(52) U.S. Cl.
CPC .................................. *G01J 5/0853* (2013.01)
USPC ............................................................ 252/501.1

(58) Field of Classification Search
CPC ............... G01J 5/12; G01J 5/20; G01J 5/046; G01J 5/0853; C01B 31/043
USPC ...................................................... 252/501.1
See application file for complete search history.

(56) References Cited

U.S. PATENT DOCUMENTS

2010/0032788 A1    2/2010    Ulbrich
2011/0024792 A1*   2/2011    Biris et al. ............... 257/184

FOREIGN PATENT DOCUMENTS

DE    10 2008 002157 A1    12/2009

* cited by examiner

*Primary Examiner* — Thomas L Dickey
(74) *Attorney, Agent, or Firm* — Peter A. Nieves; Sheehan Phinney Bass + Green PA

(57) ABSTRACT

Graphene-based thermopiles are provided. The graphene-based thermopiles may include thermocouples having one or more graphene strips that may be polarized to adjust their Seebeck coefficients. The polarized graphene strips may have larger Seebeck coefficients than the materials conventionally used in thermopile devices. As a result, the graphene-based thermopiles may generate large output voltages using fewer thermocouples than conventional thermopile devices.

23 Claims, 12 Drawing Sheets

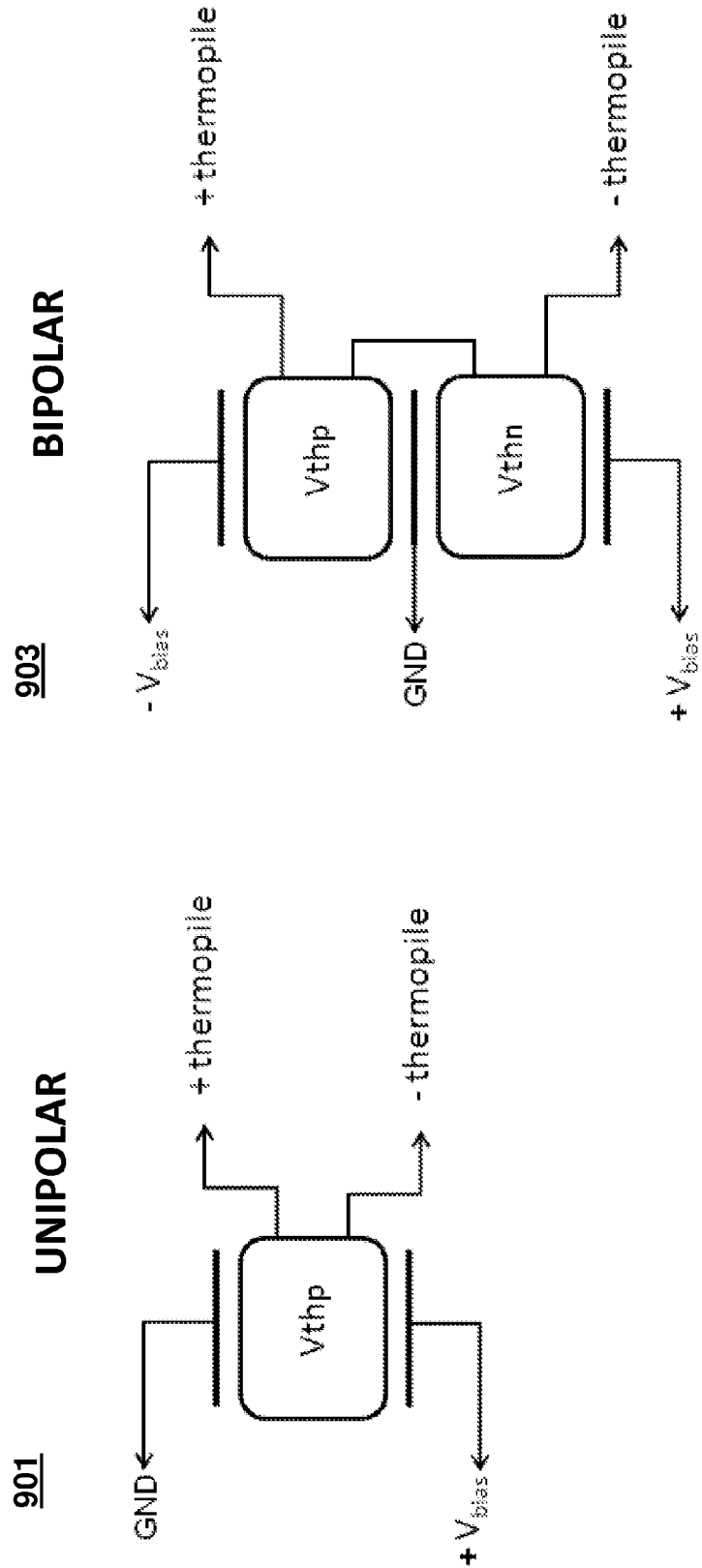

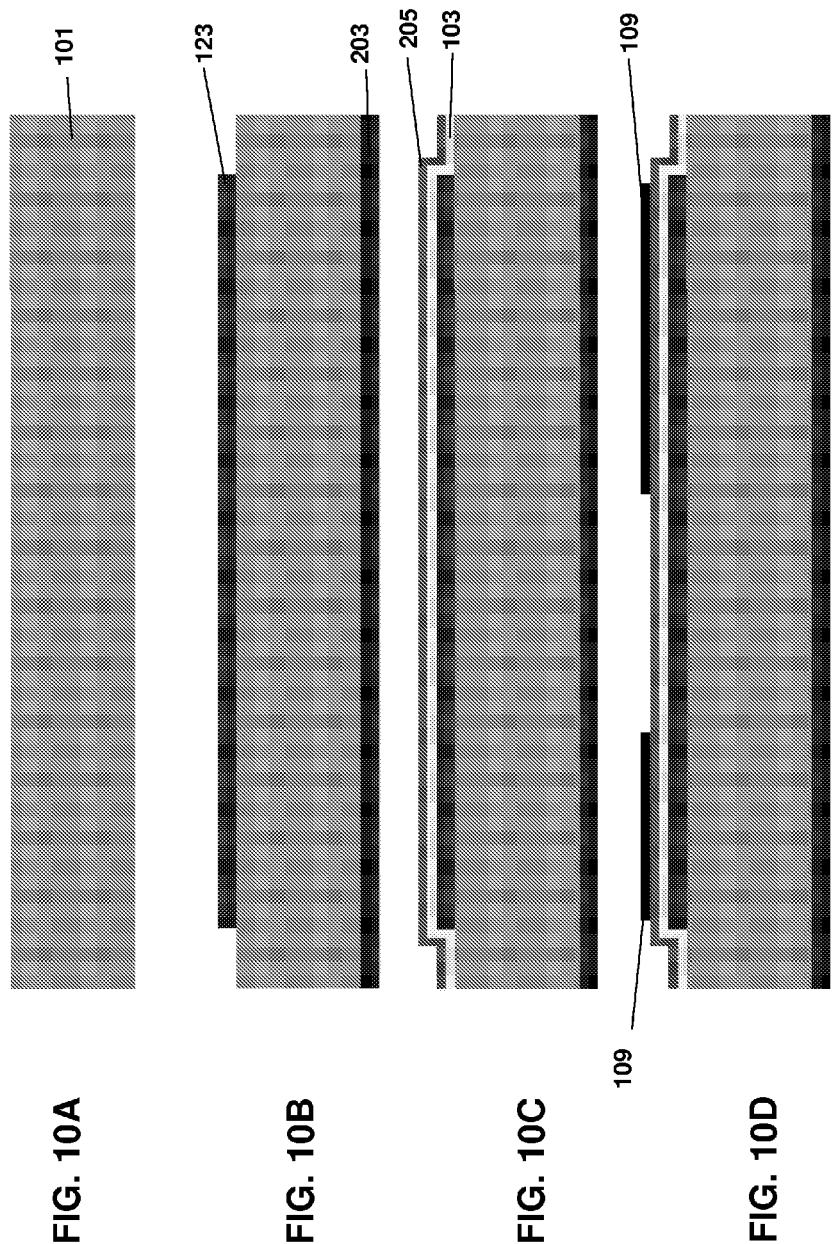

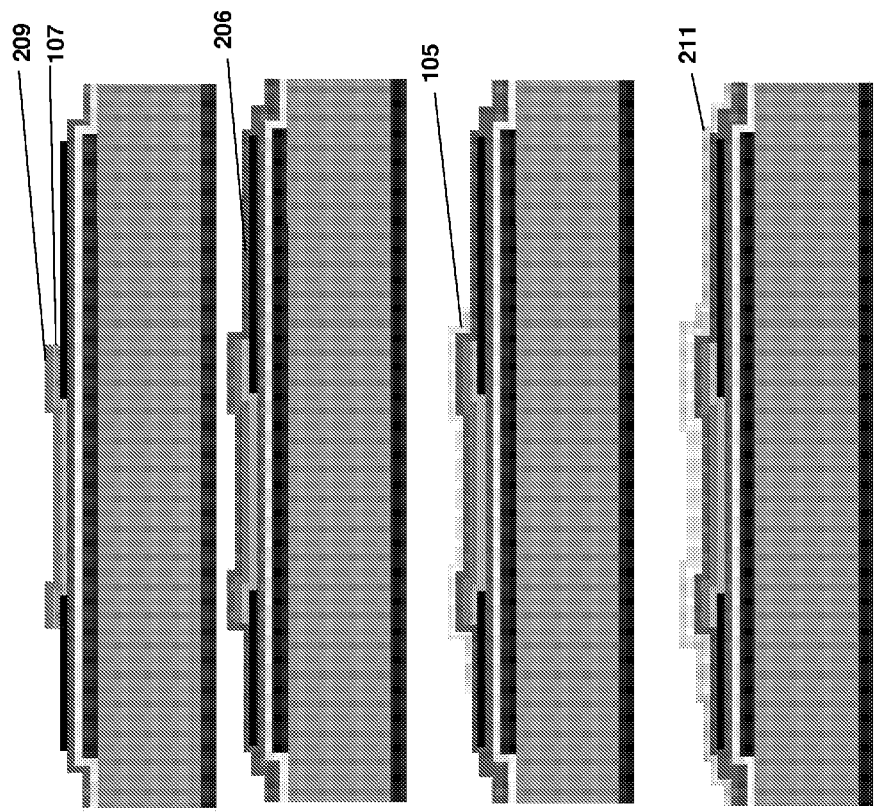

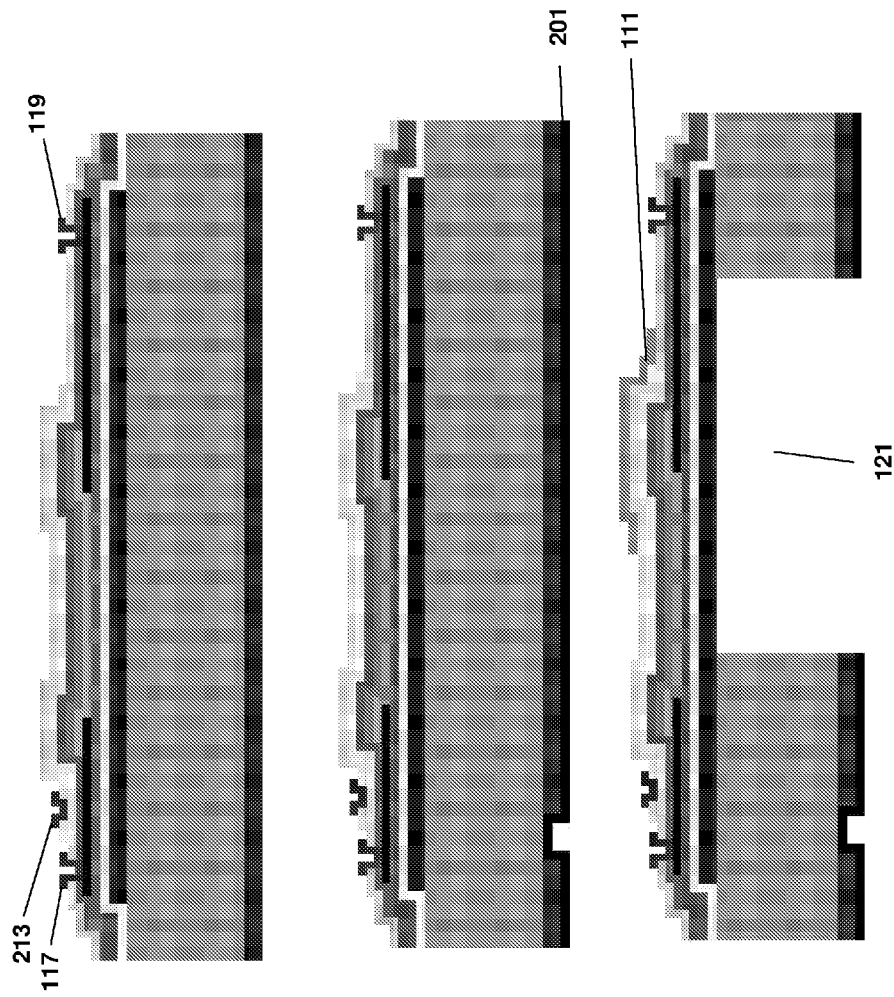

GRAPHENE-BASED THERMOPILE

CROSS-REFERENCE TO RELATED APPLICATIONS

This application claims the benefit of U.S. Provisional Patent Application Ser. No. 61/504,659, filed Jul. 5, 2011, entitled "GRAPHENE-BASED THERMOPILE," which is incorporated by reference herein in its entirety.

FIELD

The present disclosure relates generally to thermopiles, and more particularly, to graphene based thermopiles.

RELATED ART

A thermopile is an infrared radiation (IR) detector commonly used for making non-contact temperature measurements. For example, thermopiles are used in ear thermometers, proximity sensors, heat flux sensors, and the like. Thermopiles are made up of a series of electrically connected thermocouple pairs, each pair made up of dissimilar conducting or semi-conducting materials with different Seebeck coefficients. For example, N-type poly-silicon and P-type poly-silicon are often used in conventional thermopiles.

Generally, one end of each thermocouple is placed in contact with a membrane operable to collect IR energy while the other end is placed on a supporting substrate. The collected IR energy creates a temperature gradient across the thermocouple, causing the thermocouple to generate an output voltage via the Seebeck effect. For a thermocouple having known characteristics, the output voltage may be converted into a temperature value.

Since the output voltage of a thermocouple is relatively small, generally in the range of a few microvolts, the output voltage may be amplified prior to being converted into a temperature value. However, amplification may introduce a margin of error or noise into the measurement result. Thus, to reduce the amount of error or noise that is introduced, a larger output voltage may be desired since a larger voltage requires less amplification.

To generate a larger output voltage, thermopiles generally include multiple thermocouples connected in series. While including multiple thermocouples in this manner may increase the output voltage of the thermopile, it also increases the size of the thermopile device. Thus, this method of increasing the output voltage may not be practical in applications requiring small thermopile sensors.

Thus, a compact thermopile capable of producing large output voltages is desired.

BRIEF SUMMARY

Graphene-based thermopile devices are provided. The thermopile may comprise: an absorber region; a thermocouple comprising a first strip formed from graphene and with one end thereof being thermally coupled to the absorber region and a second strip with one end thereof being thermally coupled to the absorber region, wherein the second strip is coupled to the first strip; and a circuit arranged to apply a first external (bias or polarizing) voltage to the first strip so that said strips generate a voltage in response to radiation received by the absorber region.

In some examples, the second strip may be formed from graphene or a metal, and the circuit may be further arranged to apply a second external (bias or polarizing) voltage to the second strip. In some examples, the first external voltage may be positive, and the second external voltage may be negative. The external voltages may be supplied by a battery.

In other examples, the thermopile may comprise: a semiconductor substrate; a first bias plate operable to couple to a first voltage source; a ground plate operable to couple to ground; a first thermocouple comprising: a first strip having a first Seebeck coefficient; and a first graphene strip coupled to the first strip and at least partially disposed between the first bias plate and the ground plate, wherein the first graphene strip has a second Seebeck coefficient that is different from the first Seebeck coefficient when the first voltage source is applied to the first bias plate; and an absorber thermally coupled to the first thermocouple, wherein the first thermocouple is operable to generate a voltage in response to receiving radiation from the absorber, the voltage corresponding to an amount of received radiation.

In some examples, the thermopile may further comprise a second thermocouple comprising: a second strip having a third Seebeck coefficient, wherein the second strip is coupled to the first graphene strip; and a second graphene strip coupled to the second strip and at least partially disposed between the first bias plate and the ground plate, wherein the second graphene strip has a fourth Seebeck coefficient that is different from the third Seebeck coefficient when the first voltage source is applied to the first bias plate. In some examples, first and third Seebeck coefficients may be substantially the same, and the second and fourth Seebeck coefficients may be substantially the same.

In some examples, the first strip may comprise aluminum and the bias plate may comprise a layer of doped silicon capped with a layer of titanium silicon.

In other examples, a bipolar graphene thermopile is provided. The bipolar graphene thermopile may comprise: a semiconductor substrate; a first bias plate operable to couple to a first voltage source; a second bias plate operable to couple to a second voltage source; a ground plate operable to couple to ground; a first thermocouple comprising: a first graphene strip at least partially disposed between the first bias plate and the ground plate, wherein the first graphene strip has a first Seebeck coefficient when the first voltage source is applied to the first bias plate; and a second graphene strip coupled to the first graphene strip and at least partially disposed between the second bias plate and the ground plate, wherein the second graphene strip has a second Seebeck coefficient that is different than the first Seebeck coefficient when the second voltage source is applied to the second bias plate; and an absorber thermally coupled to the first thermocouple, wherein the first thermocouple is operable to generate a voltage in response to receiving radiation from the absorber, the voltage corresponding to an amount of received radiation.

In some examples, the bipolar graphene thermopile may further include a third graphene strip coupled to the second graphene strip and at least partially disposed between the first bias plate and the ground plate, wherein the third graphene strip has a third Seebeck coefficient when the first voltage source is applied to the first bias plate; and a fourth graphene strip coupled to the third graphene strip and at least partially disposed between the second bias plate and the ground plate, wherein the fourth graphene strip has the fourth Seebeck coefficient that is different from the third Seebeck coefficient when the second voltage source is applied to the second bias plate.

In some examples, the first and third Seebeck coefficients may be substantially the same, and the second and fourth Seebeck coefficients may be substantially the same.

In some examples, the thermopile further comprises: a first polymer layer disposed between the first graphene strip and the first bias plate; and a second polymer layer disposed between the second graphene strip and the second bias plate.

In some examples, the thermopile further comprises a front-mounted or back-mounted ground contact. In some examples, the first and second bias plates may each comprise a layer of doped silicon capped with a layer of titanium silicon.

Processes for making graphene-based thermopiles are also provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 9A and 9B illustrate block diagrams of both unipolar and bipolar thermopiles.

FIGS. 10A-10D, 11A-11D, and 12A-12C illustrate a process for making an exemplary unipolar graphene thermopile having a back-mounted ground contact.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to graphene-based thermopiles. The thermopiles may include thermocouples having one or more graphene strips that may be polarized to adjust their Seebeck coefficients. The polarized graphene strips may have larger Seebeck coefficients than the materials conventionally used in thermopile devices. As a result, the graphene-based thermopiles may generate large output voltages using fewer thermocouples than conventional thermopile devices.

Figure 1:
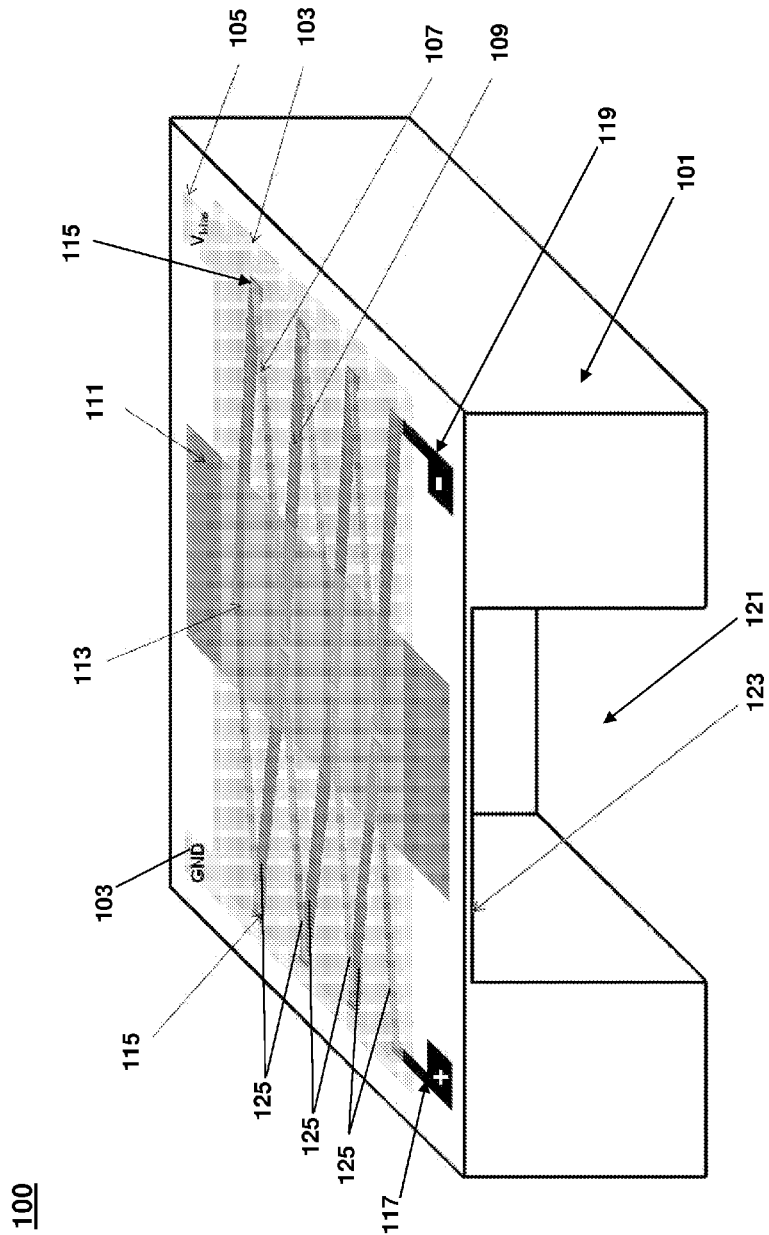
FIG. 1 illustrates an exemplary unipolar graphene thermopile.

FIG. 1 illustrates an exemplary unipolar graphene thermopile 100. Graphene thermopile 100 may include one or more thermocouple pairs 125 formed on substrate 101. Substrate 101 may include a silicon substrate commonly used in semiconductor devices, for example, a double-side polished silicon wafer that may be doped as either an N-type substrate or a P-type substrate. In some examples, substrate 101 may have a resistivity of less than about 10 Ω/cm.

The one or more thermocouple pairs 125 formed on substrate 101 may include pairs of thermoelectric layers having different Seebeck coefficients. For example, the thermoelectric layers may include alternating strips of graphene strips 107 and metal strips 109. Graphene strips 107 may include layers of graphene material covered by a thin polymer film. Metal strips 109 may include conducting or semi-conducting materials, such as metal, N-type poly-silicon, or P-type poly-silicon.

Graphene thermopile 100 may further include ground plate 103 and bias plate 105 for polarizing graphene strips 107. The graphene strips 107 of thermocouple pairs 125 may be disposed between ground plate 103 and bias plate 105. As will be discussed in greater detail below, a bias voltage may be applied to bias plate 105 in order to adjust the Seebeck coefficient of the graphene material. Ground plate 103 and bias plate 105 may include any conducting material, such as a metal or doped silicon material. In some examples, ground plate 103 and bias plate 105 may be made of silicon having the same doping type as substrate 101 and may be capped with a layer of TiSi.

Graphene thermopile 100 may further include absorber 111 disposed on at least a portion of the thermocouples as shown in FIG. 1. Absorber 111 may be configured to absorb IR radiation and may be made of any thermally absorptive material, such as carbon-black, black-gold, other compounds or organic compounds or mixtures, or the like. Absorber 111 may be thermally coupled to thermocouple pairs 125 such that heat absorbed by absorber 111 may be transferred to thermocouple pairs 125. The end of thermocouple pairs 125 covered by absorber 111 may be referred to as hot junction 113, while the end of thermocouple pairs 125 opposite hot junction 113 may be referred to as cold junction 115. The temperature difference between hot junction 113 and cold junction 115 may cause a voltage to be generated across thermocouple pairs 125 via the Seebeck effect. This voltage may be measured and converted into a temperature measurement.

To measure the voltage generated by thermocouple pairs 125, graphene thermopile 100 may further include positive measurement contact 117 and negative measurement contact 119. Positive measurement contact 117 and negative measurement contact 119 may be formed of any electrically conductive metal, such as aluminum, gold, or the like. In some examples, positive measurement contact 117 and negative measurement contact 119 may be positioned at the cold junction 115 ends of the series-connected thermocouple pairs 125. In these examples, the voltage across the measurement contacts 117 and 119 may represent the combined voltage across the seven thermocouple pairs of graphene thermopile 100.

While the thermocouple pairs 125 of graphene thermopile 100 are connected in series between negative measurement contact 119 and positive measurement contact 117, it should be appreciated that thermocouple pairs 125 may instead by connected in parallel or may be connected in a combination of series and parallel.

Additionally, while graphene thermopile 100 is shown having seven thermocouple pairs 125, one of ordinary skill will appreciate that any number of thermocouple pairs may be included and arranged in a manner similar to that shown in FIG. 1. For instance, in some examples, graphene thermopile 100 may include ten or more thermocouple pairs 125.

In some examples, cavity 121 may be formed in substrate 101 below both absorber 111 and at least a portion of the thermocouple pairs 125. Cavity 121 may provide at least partial thermal insulation for absorber 111 and thermocouple pairs 125. Cavity 121 may be formed using any known etching method, for example, anisotropic etching or DRIE etching, as described in U.S. Patent Application Publication No. 2003/0118076, which is incorporated herein by reference in its entirety as if put forth in full below.

In some examples, absorber 111 and portions of thermocouple pairs 125 located at hot junction 113 may be suspended by membrane 123 over cavity 121. Membrane 123 may provide mechanical support for thermocouple pairs 125 after a portion of substrate 101 below thermocouple pairs 125 is etched away. Membrane 123 may be made of a material having a low thermal conductivity, such as silicon nitride, silicon dioxide, organic plastic, or the like. In some examples, membrane 123 may include $SiO_2$ and $Si_3N_4$ layers having a total thickness of about 1.1 µm.

Figure 2:
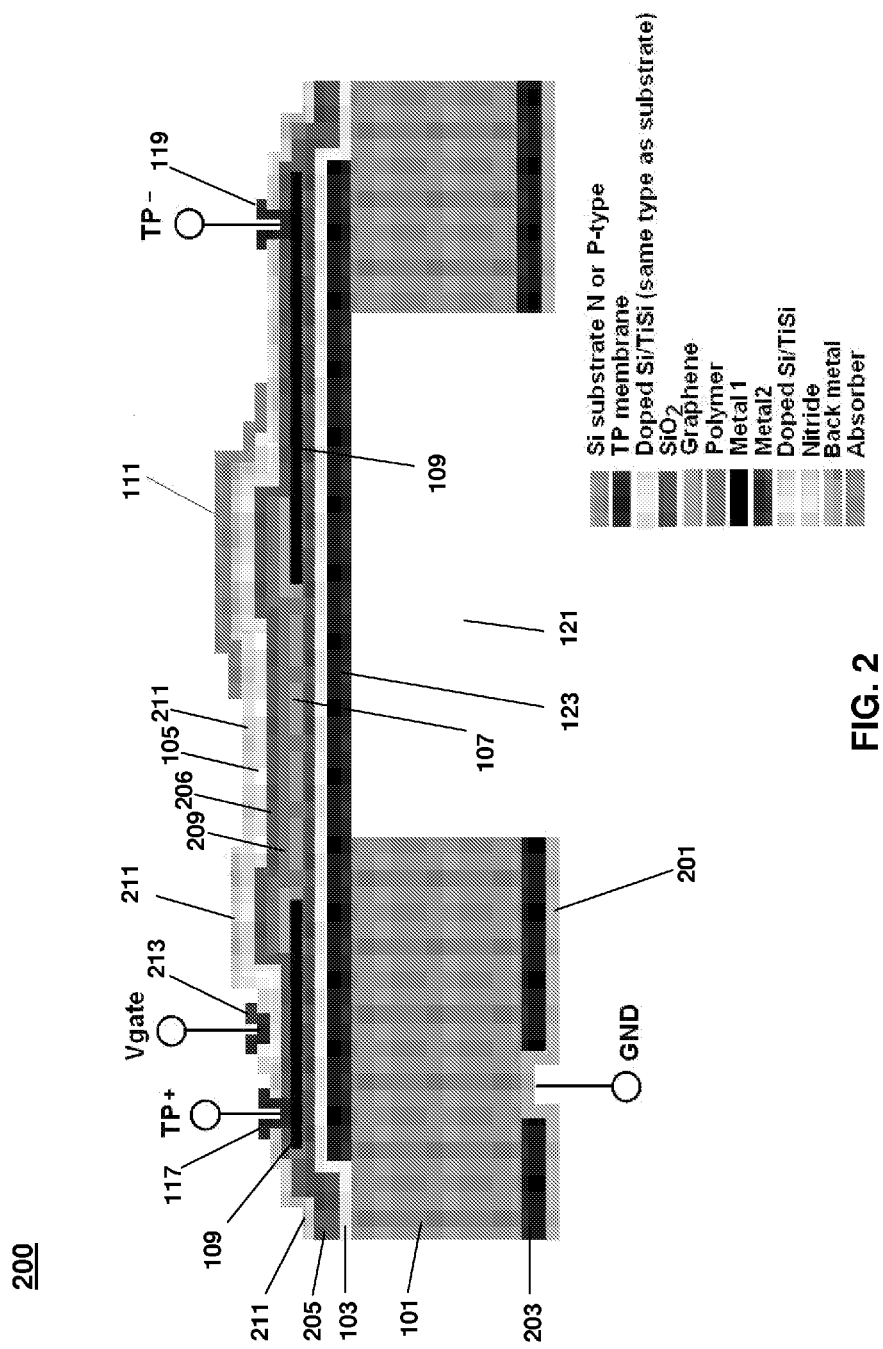
FIG. 2 illustrates a cross-sectional view an exemplary unipolar graphene thermopile having a back-mounted ground contact.

FIG. 2 illustrates a cross-sectional view of an exemplary unipolar graphene thermopile 200 having a back-mounted ground contact. Graphene thermopile 200 may include back metal 201 coupled to ground and disposed on the bottom side of the device. Back metal 201 may be formed of any electrically conductive metal, such as aluminum, gold, or the like. In some examples, back metal 201 may be made of aluminum and may have a thickness of about 1.1 µm.

Graphene thermopile 200 may further include back membrane 203 disposed between back metal 201 and substrate 101. Back membrane 203 may be made of a material similar or identical to that of membrane 123. For instance, back membrane 203 may be made of a material having a low thermal conductivity, such as silicon nitride, silicon dioxide, organic plastic, or the like. In some examples, back membrane 203 may include $SiO_2$ and $Si_3N_4$ layers having a total thickness of about 1.1 µm. Additionally, as shown on the left side of FIG. 2, at least a portion of back membrane 203 may be etched away, allowing a portion of back metal 201 to contact substrate 101.

Graphene thermopile 200 may further include substrate 101 disposed above back metal 201 and back membrane 203. As discussed above, substrate 101 may be a silicon substrate commonly used in semiconductor devices, for example, a double-side polished silicon wafer that may be doped as either an N-type substrate or a P-type substrate. In some examples, substrate 101 may have a resistivity of less than about 10 Ω/cm.

Graphene thermopile 200 may further include cavity 121 etched into substrate 101. As discussed above, cavity 121 may provide at least partial thermal insulation for absorber 111 and thermocouple pairs 125 and may be formed using any known etching method, for example, anisotropic etching or DRIE etching, as described in U.S. Patent Application Publication No. 2003/0118076.

Graphene thermopile 200 may further include membrane 123 disposed on at least a portion of substrate 101 and spanning cavity 121. As discussed above, membrane 123 may provide mechanical support for thermocouple pairs 125 after a portion of substrate 101 is etched away to form cavity 121. Membrane 123 may be made of a material having a low thermal conductivity, such as silicon nitride, silicon dioxide, organic plastic, or the like. In some examples, membrane 123 may include $SiO_2$ and $Si_3N_4$ layers having a total thickness of about 1.1 µm.

Graphene thermopile 200 may further include ground plate 103 layered on top of membrane 123 and substrate 101 as shown in FIG. 2. Ground plate 103 may be coupled to ground via substrate 101 and back-metal 201. In some examples, ground plate 103 may include a plasma-enhanced chemical vapor deposition (PECVD) layer of doped silicon. The silicon layer may have a doping concentration of about 4% and may have a thickness of about 0.1 µm. In some examples, the doped silicon layer may be capped with a layer of TiSi.

Graphene thermopile 200 may further include a first insulating layer 205 disposed on ground plate 103 and below graphene strip 107 and metal strips 109. The first insulating layer 205 may provide electrical insulation between ground plate 103 and graphene strip 107 and metal strips 109. In some examples, insulating layer 205 may include an electrically insulating material, such as a PECVD layer of $SiO_2$ having a thickness of about 0.15 µm.

Graphene thermopile 200 may further include graphene strip 107 and metal strips 109 disposed on insulating layer 205. Graphene strip 107 may include graphene material and, in some examples, may have a thickness of about one atomic layer. Graphene strip 107 may be coupled to positive and negative measurement contacts 117 and 119 via metal strips 109. Metal strips 109 may be formed of any electrically conductive metal, such as aluminum, gold, or the like. In some examples, metal strips 109 may include aluminum having a thickness of about 0.3 µm. It should be appreciated that the configuration shown in FIG. 2 is a simplified view of thermopile 200. Specifically, thermopile 200 may include additional pairs of graphene strips 107 and metal strips 109. Thus, while a single graphene strip 107 is shown coupled to metal strips 109, it should be appreciated that any number of graphene strips 107 may be included and coupled in series with any number of metal strips 109 in an arrangement similar to that shown in FIG. 1.

Graphene thermopile 200 may further include polymer layer 209 disposed on graphene strip 107. In some examples, polymer layer 209 may include parylene having a thickness of 0.02-0.2 µm, for example, about 0.05 µm.

Graphene thermopile 200 may further include a second insulating layer 206 disposed on metal strips 109 and polymer layer 209. The second insulating layer 206 may electrically insulate graphene strip 107 and metal strips 109 from bias plate 105. Insulating layer 206 may be made of a similar or identical material as that of insulating layer 205, for example, insulating layer 206 may include an electrically insulating material, such as a PECVD layer of $SiO_2$ having a thickness of about 0.15 µm. In some examples, the second insulating layer 206 may be physically separated from first insulating layer 205. In other examples, such as that shown in FIG. 2, second insulating layer 206 may be connected to first insulating layer 205.

Graphene thermopile 200 may further include bias plate 105 disposed on the second insulating layer 206. In some examples, similar to ground plate 103, bias plate 105 may include a PECVD layer of doped silicon. The silicon layer may have a doping concentration of about 4% and may have a thickness of about 0.1 µm. In some examples, the doped silicon layer may be capped with a layer of TiSi.

Graphene thermopile 200 may further include nitride layer 211 disposed on bias plate 105 and the second insulating layer 206. In some examples, nitride layer 211 may include a PECVD layer of $Si_3N_4$ having a thickness of about 0.37 µm.

Graphene thermopile 200 may further include positive measurement contact 117 and negative measurement contact 119 for providing contact points to measure the voltage generated by graphene thermopile 200. Positive measurement contact 117 and negative measurement contact 119 may be coupled to metal strips 109, respectively, through holes etched in the second insulating layer 206 and nitride layer 211. This allows positive measurement contact 117 and negative measurement contact 119 to electrically couple to the positive and negative ends of the graphene thermocouple formed by graphene strip 107 and metal strips 109. As discussed above, thermopile 200 may include additional graphene strips 107 and metal strips 109 forming thermocouple pairs 125. In these examples, positive measurement contact 117 and negative measurement contact 119 may be coupled to opposite ends of the coupled thermocouple pairs 125. Positive measurement contact 117 and negative measurement contact 119 may be formed of any electrically conductive metal, such as aluminum, gold, or the like. In some examples, positive measurement contact 117 and negative measurement contact 119 may include aluminum having a thickness of about 1.1 µm.

Graphene thermopile 200 may further include bias terminal 213 for applying a bias voltage to bias plate 105. Bias terminal 213 may be formed of any electrically conductive metal, such as aluminum, gold, or the like. In some examples, bias terminal 213 may include aluminum having a thickness of about 1.1 µm. Bias terminal 213 may be coupled to bias plate 105 through a hole etched into nitride layer 211. In operation, a bias voltage may be applied to bias terminal 213 in order to polarize graphene strip 107 through bias plate 105. The bias voltage may be used to adjust the Seebeck coefficient of graphene strip 107.

Specifically, graphene strips 107 may be operable to have a Seebeck coefficient that is different from the Seebeck coefficient of metal strips 109 when the bias voltage is applied to bias plate 105. In some examples, a bias voltage of 0.7-1.0 V may be applied to bias plate 105, causing graphene strips 107 to have a Seebeck coefficient of 10-30 mV/° K. In these examples, metal strips 109 may have a Seebeck coefficient between −2.0 µV/° K. and 2.0 µV/° K. In some examples, a low-voltage battery may be applied to bias plate 105 to polarize graphene strips 107.

In some examples, graphene thermopile 200 may include multiple graphene strips 107 and multiple metal strips 109. In these examples, each graphene strip 107 may be have a Seebeck coefficient that is substantially the same as every other graphene strip 107 when the bias voltage is applied to bias plate 105. For example, the difference between Seebeck coefficients of the graphene strips 107 may be equal to or less than 5% when the bias voltage is applied to bias plate 105. Additionally, in some examples, each metal strip 109 may have a Seebeck coefficient that is substantially the same as every other metal strip 109. For example, the difference between Seebeck coefficients of the metal strips 109 may be equal to or less than 5%.

Figure 3:
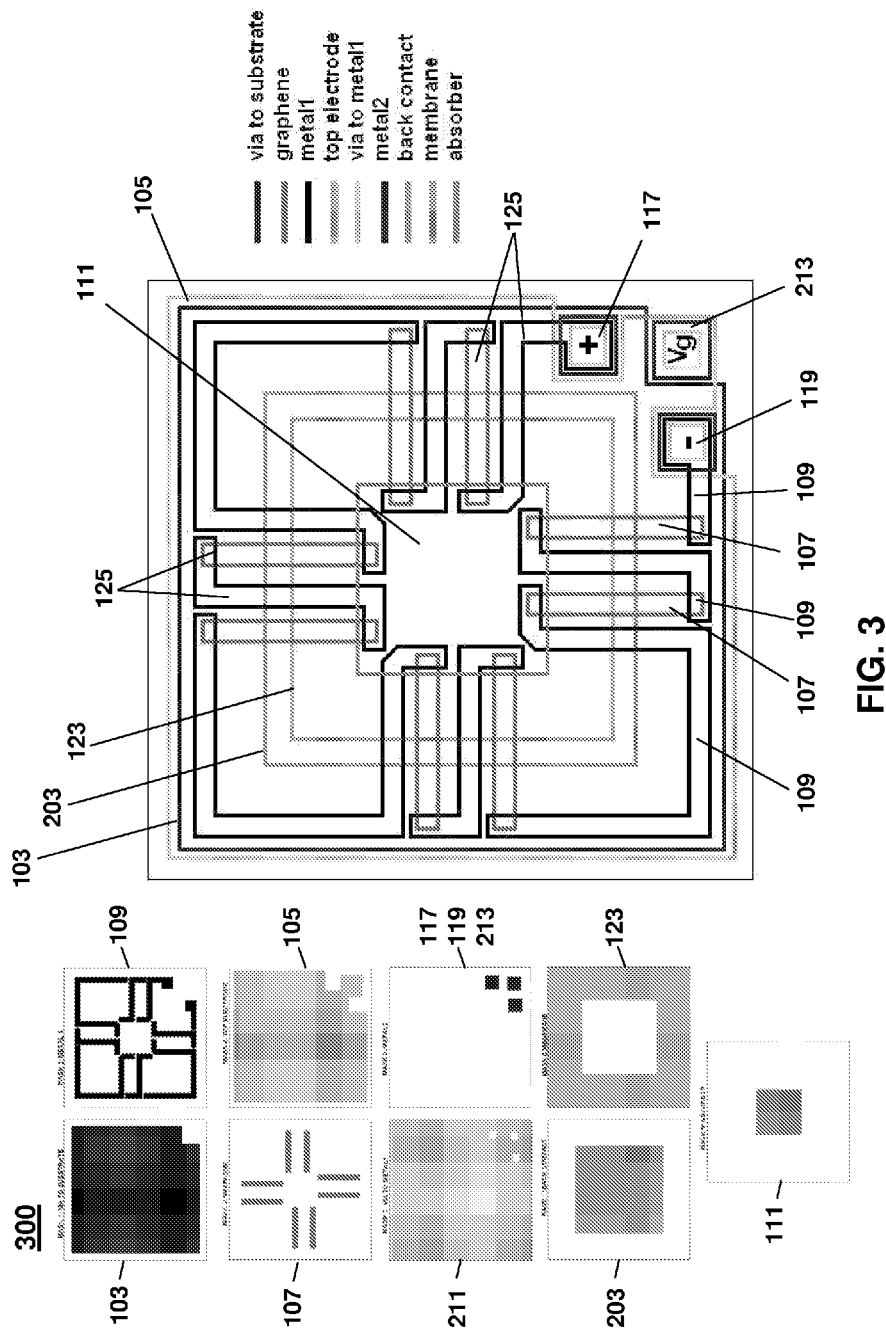
FIG. 3 illustrates a top view of a layout of masks that may be used to form an exemplary unipolar graphene thermopile.

FIG. 3 illustrates a top-view of unipolar graphene thermopile 300 showing an exemplary layout of masks that may be used to form a unipolar graphene thermopile, such as graphene thermopiles 100 and 200. On the left side of FIG. 3, the various masks that may be used to etch unipolar graphene thermopile 300 are shown. On the right side of FIG. 3, the masks are shown as they are arranged to form unipolar graphene thermopile 300. In the illustrated example, unipolar graphene thermopile 300 includes eight thermocouple pairs 125, each pair having a graphene strip 107 coupled to a metal strip 109. The thermocouple pairs are coupled in series with negative measurement contact 119 and positive measurement contact 117 coupled to each end of the series-connected thermocouple pairs 125. An absorber 111 is positioned over the thermocouple pairs 125 and is configured to absorb radiation and transfer the absorbed radiation to the thermocouple pairs 125. A bias plate 105 is positioned over the thermocouple pairs and is coupled to bias terminal 213. A ground plate 103 is positioned below the thermocouple pairs 125 and is coupled to back metal 201 through substrate 101 and back membrane 203.

Figure 4:
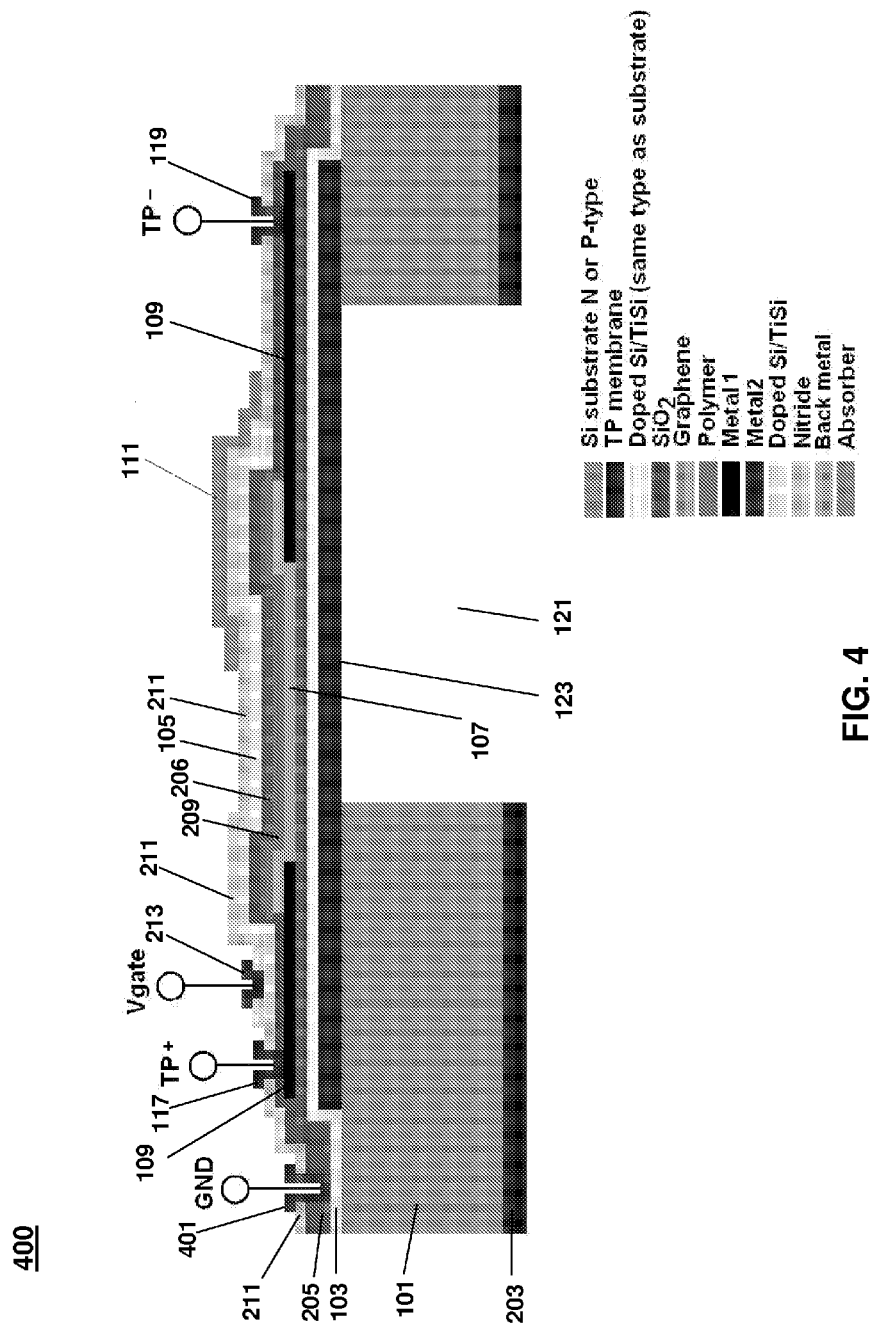
FIG. 4 illustrates a cross-sectional view an exemplary unipolar graphene thermopile having a front-mounted ground contact.

FIG. 4 illustrates a cross-sectional view of an exemplary unipolar graphene thermopile 400. Graphene thermopile 400 may be similar to graphene thermopile 200, except that the ground contact is located on the top of the thermopile device. Specifically, graphene thermopile 400 may not include back metal 201 and may not include a hole etched into back membrane 203 through to substrate 101. Instead, graphene thermopile 400 may include ground terminal 401 positioned in a hole etched through nitride layer 211 and insulating layers 205 and 206. Ground terminal 401 may be coupled to ground plate 103. Ground terminal 401 may be formed of any electrically conductive metal, such as aluminum, gold, or the like.

Figure 5:
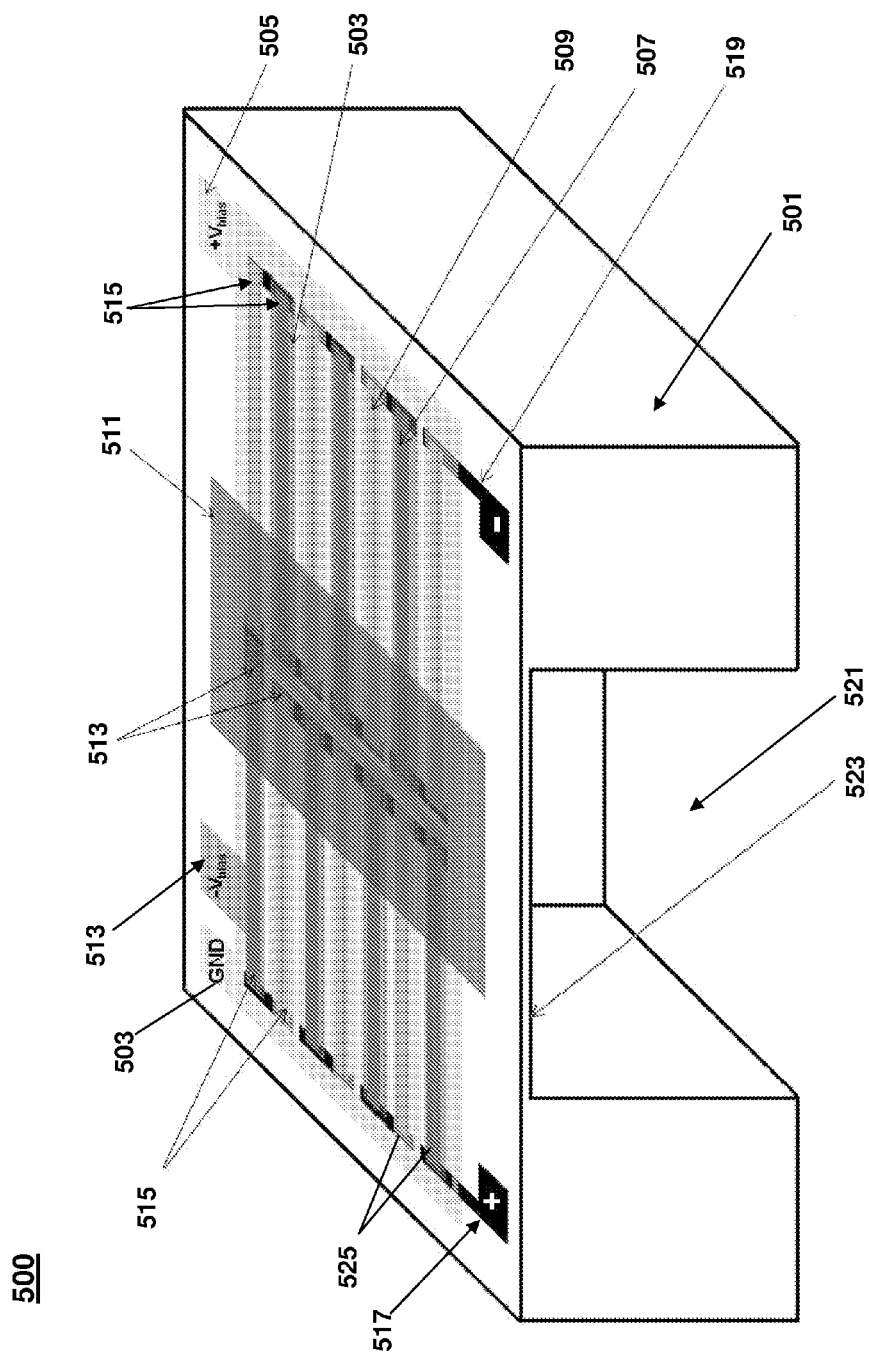
FIG. 5 illustrates an exemplary bipolar graphene thermopile.

FIG. 5 illustrates an exemplary bipolar graphene thermopile 500. Bipolar graphene thermopile 500, unlike unipolar graphene thermopile 100, includes both positively polarized graphene strips 507 and negatively polarized graphene strips 509. Having positive and negative polarized graphene strips may allow graphene thermopile 500 to generate larger output voltages due to the larger difference in Seebeck coefficients between oppositely-polarized graphene strips.

To illustrate, FIGS. 9A-B show block diagram representations of both unipolar and bipolar thermopiles. In particular, FIG. 9A shows the application of a single bias voltage $+V_{BIAS}$ to a unipolar graphene thermopile 901. Graphene thermopile 901 may be similar or identical to unipolar graphene thermopiles 200 or 400. As shown in FIG. 9A, a bias voltage $+V_{BIAS}$ may be applied to graphene thermopile 901 and an output voltage of the thermopile may be measured at the positive and negative terminals of the device. Since a single bias voltage $+V_{BIAS}$ is applied to the device, all of the graphene strips of thermopile 901 may have the same polarization.

In contrast, FIG. 9B shows the application of two different bias voltages $+V_{BIAS}$ and $-V_{BIAS}$ to the bipolar graphene thermopile 903. As shown in FIG. 9B, bias voltages $+V_{BIAS}$ and $-V_{BIAS}$ may be applied to blocks $V_{THN}$ and $V_{THP}$, respectively. Additionally, an output voltage of the thermopile may be measured at the positive and negative terminals of the device. Since two bias voltages $+V_{BIAS}$ and $-V_{BIAS}$ are applied to the device, some graphene strips of thermopile 903 may have a positive polarization while others may have a negative polarization.

Referring back to FIG. 5, graphene thermopile 500 may include one or more thermocouple pairs 525 formed on substrate 501. Substrate 501 may be a silicon substrate commonly used in semiconductor devices, for example, a double-side polished silicon wafer that may be doped as either an N-type substrate or a P-type substrate. In some examples, substrate 501 may have a resistivity of less than about 10 Ω/cm.

The one or more thermocouple pairs 525 formed on substrate 501 may include pairs of thermoelectric layers having different Seebeck coefficients. For example, the thermoelectric layers may include alternating strips of positively polarized graphene strips 507 and negatively polarized graphene strips 509

Graphene thermopile 500 may further include ground plate 503, positive bias plate 505 for polarizing graphene strips 507, and negative bias plate 513 for polarizing graphene strips 509. The positively polarized graphene strips 507 may be disposed between ground plate 503 and positive bias plate 505. Similarly, the negatively polarized graphene strips 509 may be disposed between ground plate 503 and negative bias plate 513. Ground plate 503, positive bias plate 505, and negative bias plate 513 may include a conducting material, such as a metal or doped silicon material. In some examples, ground plate 503, positive bias plate 505, and negative bias plate 513 may be made of silicon having the same doping type as substrate 501 and may be capped with a layer of TiSi. As will be discussed in further detail below, a positive bias voltage may be applied to positive bias plate 505 and a negative bias voltage may be applied to negative bias plate 513 in order to adjust the Seebeck coefficients of the graphene materials.

Graphene thermopile 500 may further include absorber 511 disposed on the thermocouples as shown in FIG. 5. Absorber 511 may be configured to absorb IR radiation and may be made of any thermally absorptive material, such as carbon-black, black-gold, other compounds or organic compounds or mixtures, or the like. Absorber 511 may be thermally coupled to thermocouple pairs 525 such that heat absorbed by absorber 511 may be transferred to thermocouple pairs 525. The end of thermocouple pairs 525 covered by absorber 511 may be referred to as hot junction 513, while the end of thermocouple pairs 525 opposite hot junction 513 may be referred to as cold junction 515. The temperature difference between hot junction 513 and cold junction 515 may cause a voltage to be generated across thermocouple pairs 525 via the Seebeck effect. This voltage may be measured and converted into a temperature measurement.

To measure the voltage generated by thermocouple pairs 525, graphene thermopile 500 may further include positive measurement contact 517 and negative measurement contact 519. Positive measurement contact 517 and negative measurement contact 519 may be formed of any electrically conductive metal, such as aluminum, gold, or the like. In some examples, positive measurement contact 517 and negative measurement contact 519 may be positioned at the cold junction 515 ends of the series-connected thermocouple pairs 525. Therefore, the voltage across the measurement contacts 517 and 519 represents the combined voltage across the seven thermocouple pairs of graphene thermopile 500.

While the thermocouple pairs 525 of graphene thermopile 500 are connected in series between negative measurement contact 519 and positive measurement contact 517, it should be appreciated that thermocouple pairs 525 may instead by connected in parallel or may be connected in a combination of series and parallel.

Additionally, while graphene thermopile 500 is shown having seven thermocouple pairs 525, one of ordinary skill will appreciate that any number of thermocouple pairs may be included and arranged in a manner similar to that shown in FIG. 5. For instance, in some examples, graphene thermopile 500 may include ten or more thermocouple pairs 525.

In some examples, cavity 521 may be formed in substrate 501 below both absorber 511 and at least a portion of the thermocouple pairs 525. Cavity 521 may provide at least partial thermal insulation for absorber 511 and thermocouple pairs 525. Cavity 521 may be formed using any known etching method, for example, anisotropic etching or DRIE etching, as described in U.S. Patent Application Publication No. 2003/0118076.

In some examples, absorber 511 and portions of thermocouple pairs 525 located at hot junction 513 may be suspended by membrane 523 over cavity 521. Membrane 523 may provide mechanical support for thermocouple pairs 525 after a portion of substrate 501 below thermocouple pairs 525 is etched away. Membrane 523 may be made of a material having a low thermal conductivity, such as silicon nitride, silicon dioxide, organic plastic, or the like. In some examples, membrane 523 may include $SiO_2$ and $Si_3N_4$ layers having a total thickness of about 1.1 μm.

Figure 6:
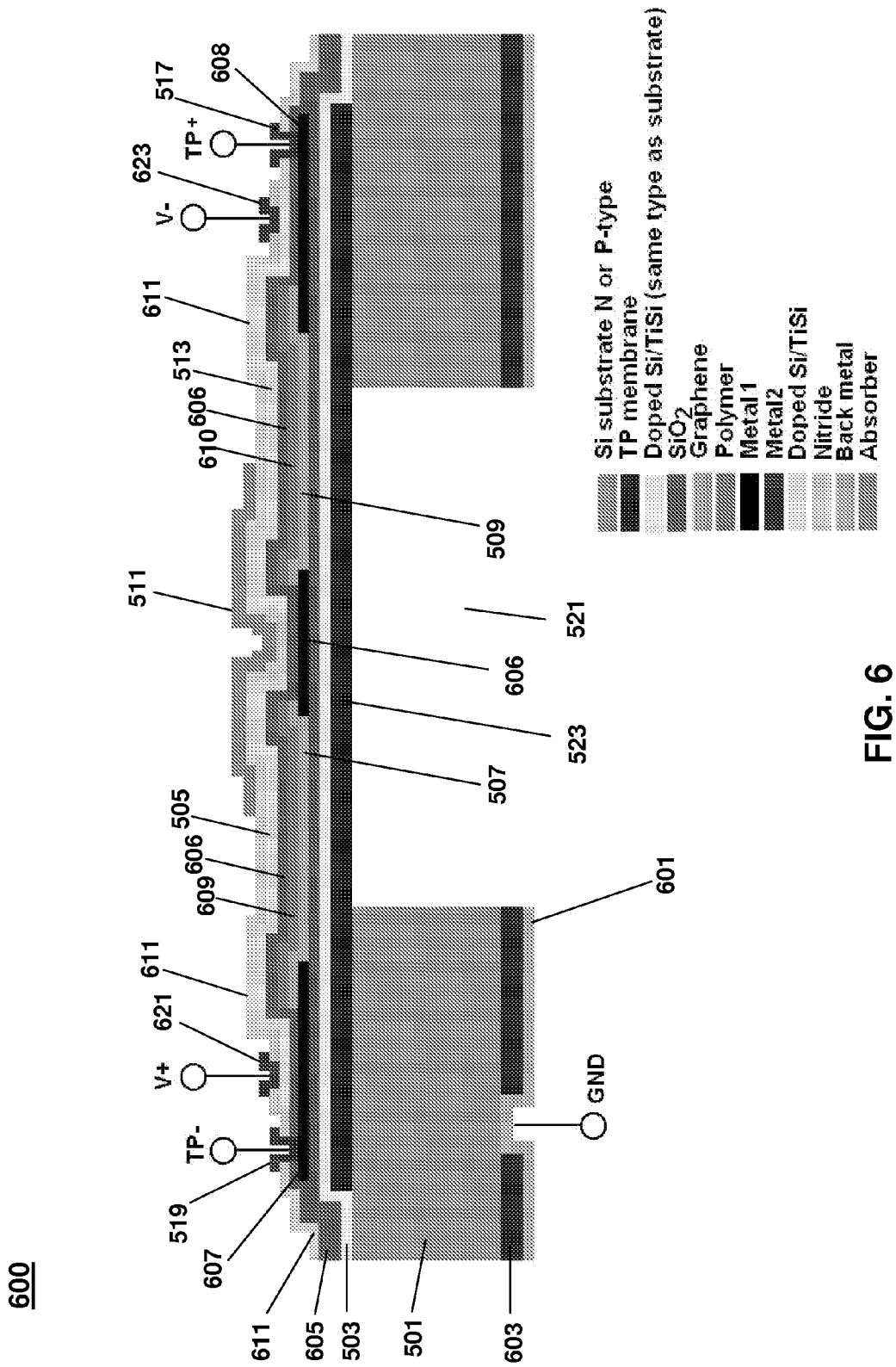
FIG. 6 illustrates a cross-sectional view an exemplary bipolar graphene thermopile having a back-mounted ground contact.

FIG. 6 illustrates a cross-sectional view of an exemplary bipolar graphene thermopile 600 having a back-mounted ground contact. In some examples, bipolar graphene thermopile 600 may include features similar to unipolar graphene thermopile 200. For instance, each side of bipolar graphene thermopile 600 may include components similar to that of unipolar graphene thermopile 200 in order to support graphene strips having two different polarizations.

Specifically, graphene thermopile 600 may include back metal 601 coupled to ground and disposed on the bottom side of the device. Back metal 601 may be formed of any electrically conductive metal, such as aluminum, gold, or the like. In some examples, back metal 601 may be made of aluminum and may have a thickness of about 1.1 μm.

Graphene thermopile 600 may further include back membrane 603 disposed between back metal 601 and substrate 501. Back membrane 603 may be made of a material similar or identical to that of membrane 523. For instance, back membrane 603 may be made of a material having a low thermal conductivity, such as silicon nitride, silicon dioxide, organic plastic, or the like. In some examples, back membrane 603 may include $SiO_2$ and $Si_3N_4$ layers having a total thickness of about 1.1 μm. Additionally, as shown on the left side of FIG. 6, at least a portion of back membrane 603 may be etched away, allowing a portion of back metal 601 to contact substrate 501.

Graphene thermopile 600 may further include substrate 501 disposed above back metal 601 and back membrane 603. As discussed above, substrate 501 may be a silicon substrate commonly used in semiconductor devices, for example, a double-side polished silicon wafer that may be doped as either an N-type substrate or a P-type substrate. In some examples, substrate 501 may have a resistivity of less than about 10 Ω/cm.

Graphene thermopile 600 may further include cavity 521 etched into substrate 501. As discussed above, cavity 521 may provide at least partial thermal insulation for absorber 511 and thermocouple pairs 525 and may be formed using any known etching method, for example, anisotropic etching or DRIE etching, as described in U.S. Patent Application Publication No. 2003/0118076.

Graphene thermopile 600 may further include membrane 523 disposed on at least a portion of substrate 501 and spanning cavity 521. As discussed above, membrane 523 may provide mechanical support for thermocouple pairs 525 after a portion of substrate 501 is etched away to form cavity 521. Membrane 523 may be made of a material having a low thermal conductivity, such as silicon nitride, silicon dioxide, organic plastic, or the like. In some examples, membrane 523 may include $SiO_2$ and $Si_3N_4$ layers having a total thickness of about 1.1 μm.

Graphene thermopile 600 may further include ground plate 503 layered on top of membrane 523 and substrate 501 as shown in FIG. 6. Ground plate 503 may be coupled to ground via substrate 501 and back-metal 601. In some examples, ground plate 503 may include a PECVD layer of doped silicon. The silicon layer may have a doping concentration of about 4% and may have a thickness of about 0.1 μm. In some examples, the doped silicon layer may be capped with a layer of TiSi.

Graphene thermopile 600 may further include a first insulating layer 605 disposed on ground plate 503 and below graphene strip 507 and metal contacts 606-608. The first insulating layer 605 may provide electrical insulation between ground plate 503 and graphene strips 507 and 509 and metal contacts 606-608. In some examples, insulating layer 605 may include an electrically insulating material, such as a PECVD layer of $SiO_2$ having a thickness of about 0.15 μm.

Bipolar graphene thermopile 600 may further include two graphene strips 507 and 509 and metal contacts 606-608 disposed on insulating layer 605. Graphene strips 507 and 509 may include graphene material and, in some examples, may have a thickness of about one atomic layer. Graphene strips 507 and 509 may be coupled together by metal contact 606 and may be coupled to positive and negative measurement contacts 517 and 519 via metal contacts 608 and 607, respectively. Metal contacts 606-608 may be formed of any electrically conductive metal, such as aluminum, gold, or the like. In some examples, metal contacts 606-608 may include aluminum having a thickness of about 0.3 μm.

Bipolar graphene thermopile 600 may further include polymer layers 609 and 610 disposed on graphene strips 507 and 509. In some examples, polymer layers 609 and 610 may include parylene having a thickness of 0.02-0.2 μm, for example, about 0.05 μm.

Bipolar graphene thermopile 600 may further include a second insulating layer 606 disposed on metal contacts 606-608 and polymer layers 609 and 610. The second insulating layer 606 may electrically insulate graphene strips 507 and 509 and metal contacts 606-608 from bias plates 505 and 513. Insulating layer 606 may be made of a similar or identical material as that of insulating layer 605, for example, insulating layer 606 may include an electrically insulating material, such as a PECVD layer of $SiO_2$ having a thickness of about 0.15 μm. In some examples, the second insulating layer 606 may be physically separated from first insulating layer 605. In other examples, such as that shown in FIG. 6, second insulating layer 606 may be connected to first insulating layer 605.

Bipolar graphene thermopile 600 may further include bias plates 505 and 513 disposed on insulating layer 606 above graphene strips 507 and 509. Bias plates 505 and 513 may include a PECVD layer of doped silicon. The silicon layer may have a doping concentration of about 4% and may have a thickness of about 0.1 μm. In some examples, the doped silicon layer may be capped with a layer of TiSi.

Bipolar graphene thermopile 600 may further include nitride layer 611 disposed on bias plates 505 and 513 and the second insulating layer 606. In some examples, nitride layer 611 may include a PECVD layer of $Si_3N_4$ having a thickness of about 0.37 μm.

Bipolar graphene thermopile 600 may further include negative measurement contact 519 and positive measurement contact 517 for providing contact points to measure the voltage generated by graphene thermopile 600. Negative measurement contact 519 and positive measurement contact 517 may be coupled to metal contacts 607 and 608 through holes etched in the second insulating layer 606 and nitride layer 611. This allows positive measurement contact 517 and negative measurement contact 519 to electrically couple to the positive and negative ends of the graphene thermocouple formed by graphene strips 507 and 509. It should be appreciated by one of ordinary skill that thermopile 600 may include additional graphene strips 507 and 509 forming additional thermocouple pairs 525. In these examples, positive measurement contact 517 and negative measurement contact 519 may be coupled to opposite ends of the series connected thermocouple pairs 525. Positive measurement contact 517 and negative measurement contact 519 may be formed of any electrically conductive metal, such as aluminum, gold, or the like. In some examples, positive measurement contact 517 and negative measurement contact 519 may include aluminum having a thickness of about 1.1 μm.

Bipolar graphene thermopile 600 may further include positive bias terminal 621 and negative bias terminal 623 for applying bias voltages to bias plates 505 and 513, respectively. Bias terminals 621 and 623 may be formed of any electrically conductive metal, such as aluminum, gold, or the like. In some examples, bias terminals 621 and 623 may include aluminum having a thickness of about 1.1 μm. Positive bias terminal 621 may be coupled to bias plate 505 through a hole etched into nitride layer 611. Similarly, negative bias terminal 623 may be coupled to bias plate 513 through another hole etched into nitride layer 611. In operation, a first bias voltage may be applied to positive bias terminal 621 to polarize graphene strip 505 while a second bias voltage may be applied to negative bias terminal 623 to polarize bias plate 513. The bias voltages may be used to adjust the Seebeck coefficients of the graphene strips 505 and 513. In some examples, the first and second voltages may be different voltages. For example, a voltage source having a positive voltage may be applied to positive bias terminal 621 while a voltage source having a negative voltage may be applied to negative bias terminal 623. In some examples, a voltage source having a voltage in the range of 0.7 to 1.0 V may be applied to positive bias terminal 621 while a voltage source having a voltage in the range of −0.7 to −1.0 V may be applied to negative bias terminal 623. As a result, graphene strip 505 may have a Seebeck coefficient in the range of 10-30 mV/° K. and graphene strip 513 may have a Seebeck coefficient in the range of −10 to −30 mV/° K. In some examples, one or more low-voltage batteries may be applied to bias plates 505 and 513 to polarize graphene strips 507 and 509.

In some examples, graphene thermopile 600 may include multiple graphene strips 507 and 509. In these examples, each graphene strip 507 may be have a Seebeck coefficient that is substantially the same as every other graphene strip 507 when the first bias voltage is applied to bias plate 505. For example, the difference between Seebeck coefficients of the graphene strips 507 may be equal to or less than 5% when the first bias voltage is applied to bias plate 505. Additionally, in some examples, each graphene strip 509 may be have a Seebeck coefficient that is substantially the same as every other each graphene strip 509 when the second bias voltage is applied to bias plate 513. For example, the difference between Seebeck coefficients of the graphene strips 509 may be equal to or less than 5% when the second bias voltage is applied to bias plate 513.

Figure 7:
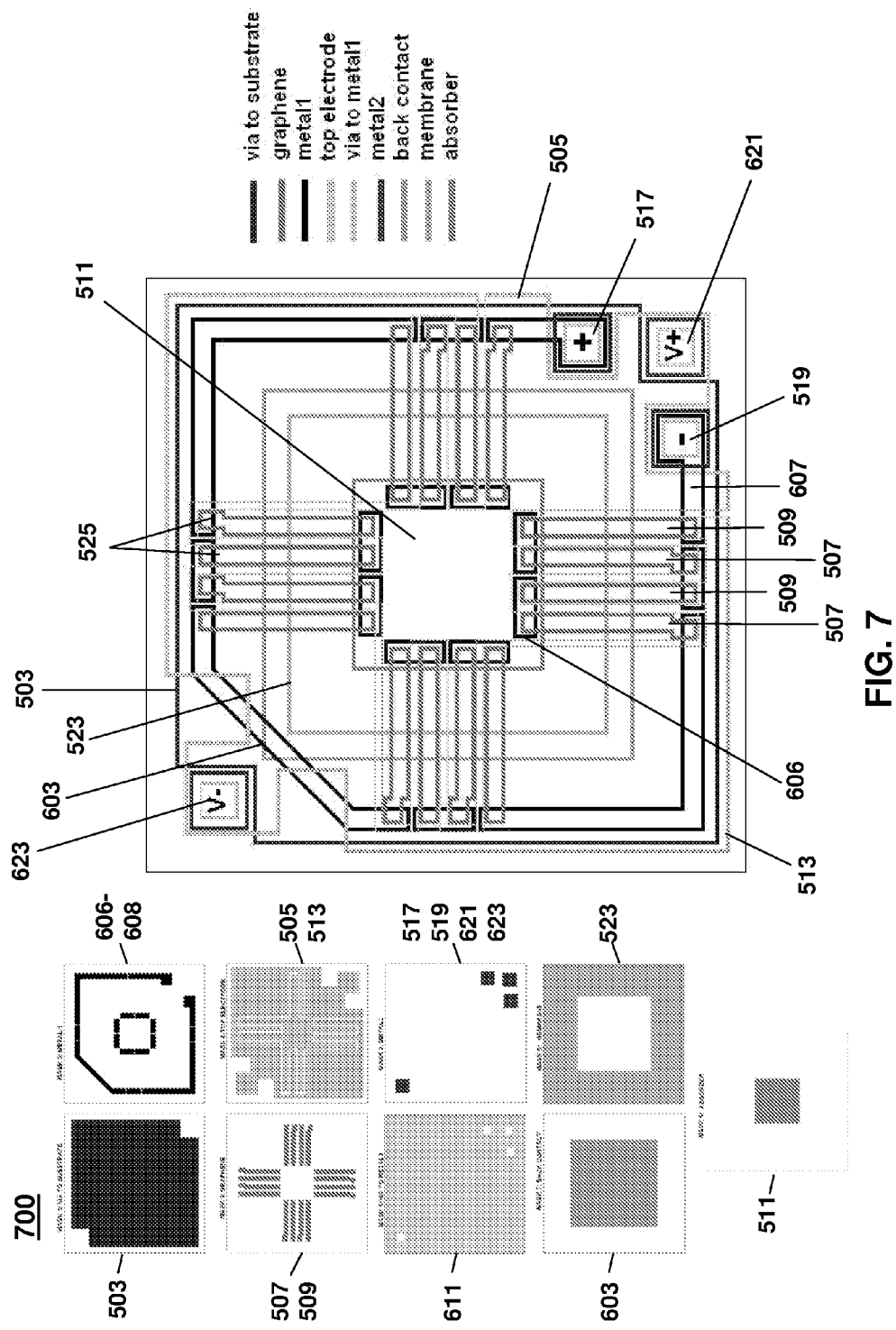
FIG. 7 illustrates a top view of a layout of masks that may be used to form an exemplary bipolar graphene thermopile.

FIG. 7 illustrates a top-view of bipolar graphene thermopile 700 showing an exemplary layout of masks that may be used to form a bipolar graphene thermopile, such as graphene thermopiles 500 and 600. On the left side of FIG. 7, the various masks that may be used to etch bipolar graphene thermopile 700 are shown. On the right side of FIG. 7, the masks are shown as they are arranged to form bipolar graphene thermopile 700. In the illustrated example, bipolar graphene thermopile 700 includes eight thermocouple pairs 525, each pair having a graphene strip 507 coupled to a graphene strip 509. The thermocouple pairs are coupled in series with negative measurement contact 519 and positive measurement contact 517 coupled to each end of the series-connected thermocouple pairs 525. An absorber 511 is positioned over the thermocouple pairs 525 and is configured to absorb radiation and transfer the absorbed radiation to the thermocouple pairs 525. A first bias plate 505 is positioned over graphene strips 507 of thermocouple pairs 525 and is coupled to positive bias terminal 621. Similarly, a second bias plate 513 is positioned over graphene strips 509 of thermocouple pairs 525 and is coupled to negative bias terminal 623. A ground plate 503 is positioned below the thermocouple pairs 525 and is coupled to back metal 601 through substrate 501 and back membrane 603.

Figure 8:
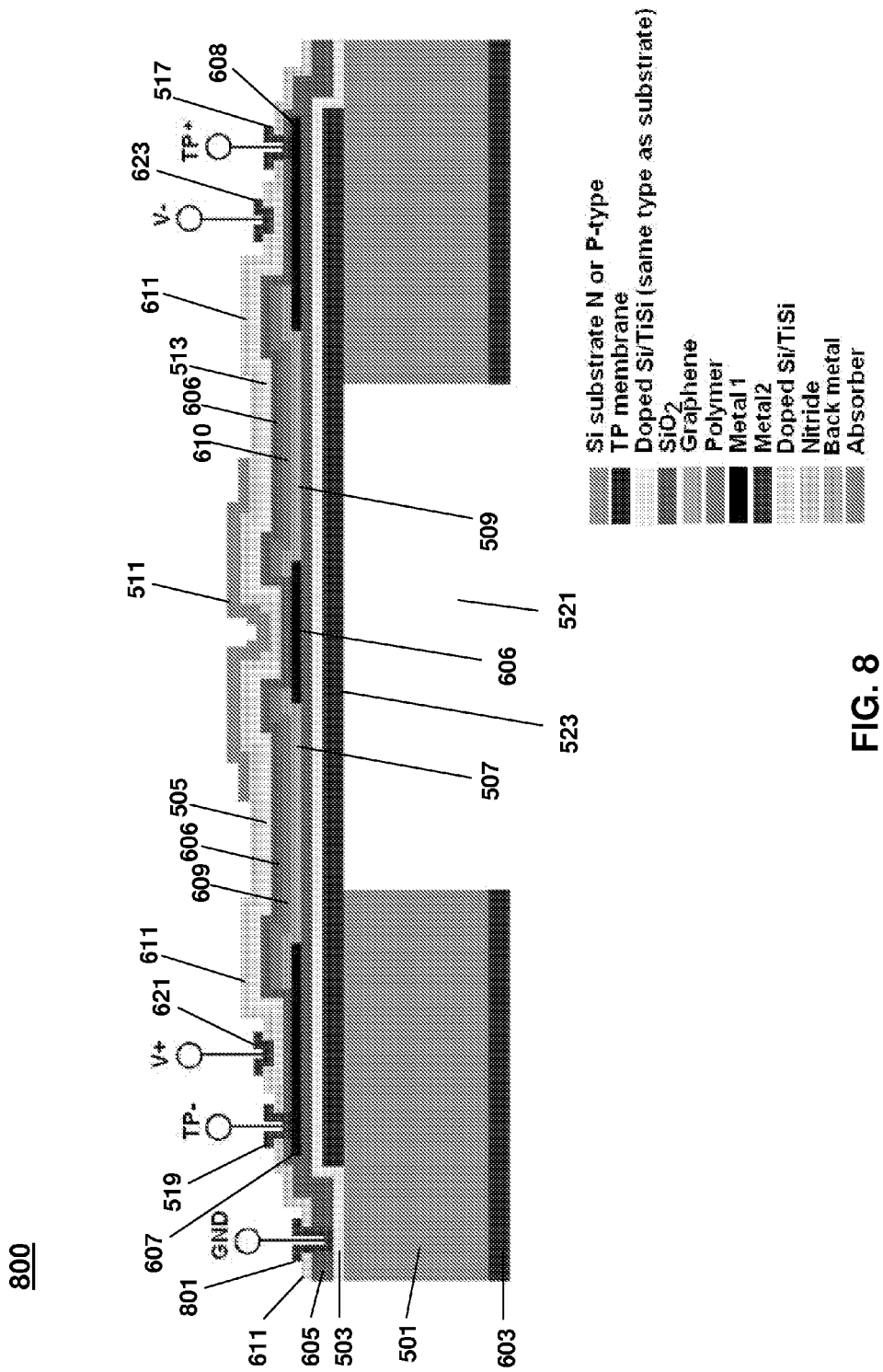
FIG. 8 illustrates a cross-sectional view an exemplary bipolar graphene thermopile having a front-mounted ground contact.

FIG. 8 illustrates a cross-sectional view of an exemplary bipolar graphene thermopile 800. Graphene thermopile 800 may be similar to graphene thermopile 600, except that the ground contact is located on the top of the thermopile device. Specifically, graphene thermopile 800 may not include back metal 601 and may not include a hole etched into back membrane 603 through to substrate 501. Instead, graphene thermopile 800 may include ground terminal 801 positioned in a hole etched through nitride layer 611 and insulating layers 605 and 606. Ground terminal 801 may be coupled to ground plate 503. Ground terminal 801 may be formed of any electrically conductive metal, such as aluminum, gold, or the like.

FIGS. 10A-D, 11A-D, and 12A-C illustrate an exemplary process for making an exemplary unipolar graphene thermopile having a back-side ground contact. In particular, FIGS. 10A-D, 11A-D, and 12A-C illustrate unipolar graphene thermopile 200 through the various stages of manufacture.

FIG. 10A illustrates the first step of the process where a silicon substrate 101 is provided. FIG. 10B illustrates the next step of the process where membrane 123 may be deposited on the upper surface of silicon substrate 101. In some examples, membrane 123 may be patterned to cover only a portion of substrate 101. Additionally, back membrane 203 may be deposited on the bottom surface of silicon substrate 101.

FIG. 10C illustrates the next step of the process where a layer of PECVD doped silicon having the same doping type as substrate 101 may be deposited on silicon substrate 101 and membrane 123 to form a ground plate 103. Additionally, a layer of SiO$_2$ may be deposited on the ground plate 103 to form insulating layer 205.

FIG. 10D illustrates the next step of the process where a layer of metal may be deposited on the insulating layer 205. The metal may be patterned to form metal strips 109 having a desired size and shape.

FIG. 11A illustrates the next step of the process where a layer of graphene material may be deposited on a portion of insulating layer 205 and a portion of metal strips 109. A layer of polymer may be deposited on the layer of graphene material. The graphene material and polymer layer may be patterned to form graphene strip 107 and polymer layer 209.

FIG. 11B illustrates the next step of the process where another layer of SiO$_2$ may be deposited on the previously deposited SiO$_2$ layer, metal strips 109, graphene strip 107, and polymer layer 209, to form insulating layer 206.

FIG. 11C illustrates the next step of the process where a layer of doped Si may be deposited on insulating layer 206. The layer of doped Si may be patterned to cover graphene strip 107, polymer layer 209, and a portion of metal strips 109. The patterned layer of dopied Si may form bias plate 105.

FIG. 11D illustrates the next step of the process where a PECVD layer of Si$_3$N$_4$ may be deposited on the upper surface of graphene thermopile 200 to form nitride layer 211. Nitride layer 211 may cover insulating layer 206 and bias plate 105.

FIG. 12A illustrates the next step of the process where portions of nitride layer 211 and insulating layer 206 may be etched away. Specifically, openings may be formed in nitride layer 211 and insulating layer 206 to expose a portion of metal strips 109. Additionally, an opening may be formed in nitride layer 211 to expose a portion of bias plate 105. A metal may be deposited into each of the openings and patterned to form positive terminal 117, negative terminal 119, and bias terminal 213.

FIG. 12B illustrates the next step of the process where a portion of back membrane 203 may be etched away, exposing a portion of substrate 101. A layer of metal may be deposited on the bottom surface of back membrane 203 and the portion of substrate 101 exposed during the etching process. The deposited layer of metal may form back metal 201.

FIG. 12C illustrates the next step of the process where a portion of back metal 201 may be etched to expose a portion of back membrane 203. The exposed portion of back membrane 203 may then be etched away to expose a portion of substrate 101. Using the remaining back metal 201 as a mask, a portion of substrate 101 may be etched to expose a portion of membrane 123. The portions of back metal 201, back membrane 203, and substrate 101 may form cavity 121. In addition, a layer of absorptive material, such as carbon-black, black-gold, other compounds or organic compounds or mixtures, or the like, may be deposited on nitride layer 211. The deposited absorptive material may be patterned to form absorber 111.

While FIGS. 10A-D, 11A-D, and 12A-C illustrate an exemplary process for making an unipolar graphene thermopile having a back-side ground contact, one of ordinary skill will appreciate that a similar process may be used to make unipolar graphene thermopiles having front-mounted ground contacts as well as bipolar graphene thermopiles having either front-mounted or back-mounted ground contacts.

Although a feature may appear to be described in connection with a particular embodiment, one skilled in the art would recognize that various features of the described embodiments may be combined. Moreover, aspects described in connection with an embodiment may stand alone.

What is claimed is:

1. A thermopile comprising:
   an absorber region;
   a thermocouple comprising:
      a first strip formed from graphene and with one end thereof being thermally coupled to the absorber region; and
      a second strip with one end thereof being thermally coupled to the absorber region, wherein the second strip is coupled to the first strip; and
   a circuit arranged to apply a first external voltage to the first strip so that said strips generate a voltage in response to radiation received by the absorber region.

2. The thermopile of claim 1, wherein the second strip is formed from graphene, and wherein the circuit is further arranged to apply a second external voltage to the second strip.

3. The thermopile of claim 2, wherein the first external voltage is positive, and wherein the second external voltage is negative.

4. The thermopile of claim 1, wherein the first external voltage is supplied by a battery.

5. The thermopile of claim 1, wherein the second strip is formed from a metal.

6. A thermopile for monitoring radiation, the thermopile comprising:
   a semiconductor substrate; a first bias plate operable to couple to a first voltage source; a ground plate operable to couple to ground;
   a first thermocouple comprising:
      a first strip having a first Seebeck coefficient; and
      a first graphene strip coupled to the first strip and at least partially disposed between the first bias plate and the ground plate, wherein the first graphene strip has a second Seebeck coefficient that is different from the first Seebeck coefficient when the first voltage source is applied to the first bias plate; and an absorber thermally coupled to the first thermocouple, wherein the first thermocouple is operable to generate a voltage in response to receiving radiation from the absorber, the voltage corresponding to an amount of received radiation.

7. The thermopile of claim 6 further comprising a second thermocouple comprising: a second strip having a third Seebeck coefficient, wherein the second strip is coupled to the first graphene strip; and a second graphene strip coupled to the second strip and at least partially disposed between the first bias plate and the ground plate, wherein the second graphene strip has a fourth Seebeck coefficient that is different from the third Seebeck coefficient when the first voltage source is applied to the first bias plate.

8. The thermopile of claim 7, wherein the first and third Seebeck coefficients are substantially the same, and wherein the second and fourth Seebeck coefficients are substantially the same.

9. The thermopile of claim 6, wherein the thermopile further comprises a polymer layer disposed between the first graphene strip and the first bias plate.

10. The thermopile of claim 6, wherein the first voltage source has a voltage between 0.7 V and 1.0 V, and wherein first graphene strip has a Seebeck coefficient between 10 mV/.degree.K and 30 mV/.degree.K when the first voltage source is applied to the first bias plate.

11. The thermopile of claim 6, further comprising a ground contact coupled to the ground plate through the substrate, wherein the ground contact is located on a side of the substrate opposite the first bias plate, ground plate, and first thermocouple.

12. The thermopile of claim 6, further comprising a ground contact coupled to the ground plate, wherein the ground contact is located on a side of the substrate that is the same as a side of the substrate that the first bias plate, ground plate, and first thermocouple are located.

13. The thermopile of claim 6, wherein the first strip comprises aluminum.

14. The thermopile of claim 6, wherein the bias plate comprises a layer of doped silicon capped with a layer of titanium silicon.

15. A thermopile for monitoring radiation, the thermopile comprising:
a semiconductor substrate; a first bias plate operable to couple to a first voltage source;
a second bias plate operable to couple to a second voltage source; a ground plate operable to couple to ground;
a first thermocouple comprising:
a first graphene strip at least partially disposed between the first bias plate and the ground plate, wherein the first graphene strip has a first Seebeck coefficient when the first voltage source is applied to the first bias plate; and a second graphene strip coupled to the first graphene strip and at least partially disposed between the second bias plate and the ground plate, wherein the second graphene strip has a second Seebeck coefficient that is different than the first Seebeck coefficient when the second voltage source is applied to the second bias plate; and an absorber thermally coupled to the first thermocouple, wherein the first thermocouple is operable to generate a voltage in response to receiving radiation from the absorber, the voltage corresponding to an amount of received radiation.

16. The thermopile of claim 15 further comprising a second thermocouple comprising:
a third graphene strip coupled to the second graphene strip and at least partially disposed between the first bias plate and the ground plate, wherein the third graphene strip has a third Seebeck coefficient when the first voltage source is applied to the first bias plate; and
a fourth graphene strip coupled to the third graphene strip and at least partially disposed between the second bias plate and the ground plate, wherein the fourth graphene strip has the fourth Seebeck coefficient that is different from the third Seebeck coefficient when the second voltage source is applied to the second bias plate.

17. The thermopile of claim 16, wherein the first and third Seebeck coefficients are substantially the same, and wherein the second and fourth Seebeck coefficients are substantially the same.

18. The thermopile of claim 15, wherein the thermopile further comprises: a first polymer strip disposed between the first graphene strip and the first bias plate; and a second polymer strip disposed between the second graphene strip and the second bias plate.

19. The thermopile of claim 15, wherein a voltage of the first voltage source is different from a voltage of the second voltage source.

20. The thermopile of claim 15, wherein the first voltage source has a voltage between 0.7 V and 1.0 V, and wherein the first Seebeck coefficient is between 10 mV/.degree.K and 30 mV/.degree.K.

21. The thermopile of claim 15, wherein the second voltage source has a voltage between −0.7 V and −1.0 V, and wherein the second Seebeck coefficient is between −10 mV/.degree.K and −30 mV/.degree.K.

22. The thermopile of claim 15, further comprising a ground contact coupled to the ground plate through the substrate, wherein the ground contact is located on a side of the substrate opposite the first bias plate, second bias plate, ground plate, and first thermocouple.

23. The thermopile of claim 15, further comprising a ground contact coupled to the ground plate wherein the ground contact is located on a side of the substrate that is the same as a side that the first bias plate, second bias plate, ground plate, and first thermocouple are located.

* * * * *